US012633832B2

(12) United States Patent (10) Patent No.: US 12,633,832 B2

Wu et al. (45) Date of Patent: May 19, 2026

---

(54) POWER CONVERTER HAVING STABLE OUTPUT VOLTAGE

(71) Applicant: ANPEC ELECTRONICS CORPORATION, Hsinchu (TW)

(72) Inventors: Cheng-Han Wu, Hsinchu (TW); Fu-Chuan Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 206 days.

(21) Appl. No.: 18/642,770

(22) Filed: Apr. 22, 2024

(65) Prior Publication Data

US 2025/0233519 A1 Jul. 17, 2025

(30) Foreign Application Priority Data

Jan. 12, 2024 (TW) ................................ 113101282

(51) Int. Cl.
*H02M 3/158* (2006.01)
*H02M 1/00* (2006.01)
*H02M 1/08* (2006.01)
*H02M 1/36* (2007.01)

(52) U.S. Cl.
CPC ......... *H02M 3/158* (2013.01); *H02M 1/0025* (2021.05); *H02M 1/08* (2013.01); *H02M 1/0009* (2021.05); *H02M 1/36* (2013.01)

(58) Field of Classification Search
CPC ...... H02M 3/158; H02M 1/0025; H02M 1/08; H02M 1/0009; H02M 1/32; H02M 1/088; H02M 1/36; H02M 3/155–1588
See application file for complete search history.

(56) References Cited

U.S. PATENT DOCUMENTS

| | | | | |
|---|---|---|---|---|
| 2015/0280544 | A1* | 10/2015 | Wang | H02M 1/32 |
| | | | | 323/285 |
| 2025/0192667 | A1* | 6/2025 | Chen | H02M 3/158 |

FOREIGN PATENT DOCUMENTS

TW 201944710 A 11/2019

* cited by examiner

*Primary Examiner* — Crystal L Hammond
*Assistant Examiner* — Jonathan Walter Soileau
(74) *Attorney, Agent, or Firm* — Li & Cai Intellectual Property Office

(57) ABSTRACT

A power converter having a stable output voltage is provided. The power converter includes a high-side switch, a low-side switch, an error amplifier, a low-side feedback circuit, a pulse wave signal generator circuit, a control circuit and a driver circuit. The low-side feedback circuit outputs a blank clock signal according to a voltage of a second end of the low-side switch, a low-side drive signal of a control end of the low-side switch and an error amplified signal from the error amplifier. The pulse wave signal generator circuit sets a frequency of a clock signal according to the blank clock signal. The control circuit outputs a control signal according to the clock signal. The driver circuit, according to the control signal, outputs a high-side drive signal to a control end of the high-side switch and outputs the low-side drive signal to the control end of the low-side switch.

20 Claims, 10 Drawing Sheets

INSS

SMTH

NES1

BLCLK

NES2

PU1SOT

POWER CONVERTER HAVING STABLE OUTPUT VOLTAGE

CROSS-REFERENCE TO RELATED PATENT APPLICATION

This application claims the benefit of priority to Taiwan Patent Application No. 113101282, filed on Jan. 12, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to power converters, and more particularly to a power converter having a stable output voltage.

BACKGROUND OF THE DISCLOSURE

For electronic devices, power converters are indispensable devices for adjusting power and supplying the adjusted power to the electronic devices. The high-side switch and the low-side switch of the power converter need to be switched according to the voltage or current data of circuit components of the power converter, so that the power converter can provide power to the load. However, the conventional control circuit of the power converter fails to effectively control the on-time of the high-side switch and the low-side switch, thus causing the output voltage of the power converter to be unstable when starting up, and when the input voltage of the power converter is excessively high, the output voltage cannot be adjusted to an appropriate voltage value.

SUMMARY OF THE DISCLOSURE

In response to the above-referenced technical inadequacies, the present disclosure provides a power converter having a stable output voltage. The power converter having a stable output voltage of the present disclosure includes a high-side switch, a low-side switch, an error amplifier, a low-side feedback circuit, a pulse wave signal generator circuit, a control circuit and a driver circuit. A first end of the high-side switch is coupled to an input voltage. A first end of the low-side switch is connected to a second end of the high-side switch. A second end of the low-side switch is grounded. A node between the first end of the low-side switch and the second end of the high-side switch is connected to a first end of an inductor. A second end of the inductor is connected to a first end of an output capacitor. A second end of the capacitor is grounded. A first input end of the error amplifier is connected to the first input end of the output capacitor. A second input end of the error amplifier is coupled to a reference voltage. A low-side feedback circuit is connected to the second end and a control end of the low-side switch and an output end of the error amplifier, and configured to output a blank clock signal according to a voltage signal at the second end of the low-side switch, a low-side drive signal at the control end of the low-side switch, and an error amplification signal received from the output end of the error amplifier. A pulse wave signal generator circuit is connected to the low-side feedback circuit, and configured to set a frequency of a clock signal and output the clock signal according to the blank clock signal received from the low-side feedback circuit. A control circuit and is connected to the pulse wave signal generator circuit, and configured to output a control signal according to the clock signal received from the pulse wave signal generator circuit. The driver circuit is connected to the control circuit, a control end of the high-side switch and the control end of the low-side switch, and configured to output a high-side drive signal to the control end of the high-side switch and output the low-side drive signal to the control end of the low-side switch according to the control signal received from the control circuit.

As mentioned above, the present disclosure provides a power converter having a stable output voltage. The switching frequency of the high-side switch and the low-side switch of the power converter of the present disclosure can be modulated according to the output voltage of the power converter of the present disclosure, including automatically reducing the switching frequency of the high-side switch and the low-side switch when the on-time of the high-side switch reaches a minimum on-time, so that the output voltage of the power converter of the present disclosure is maintained at a stable value.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
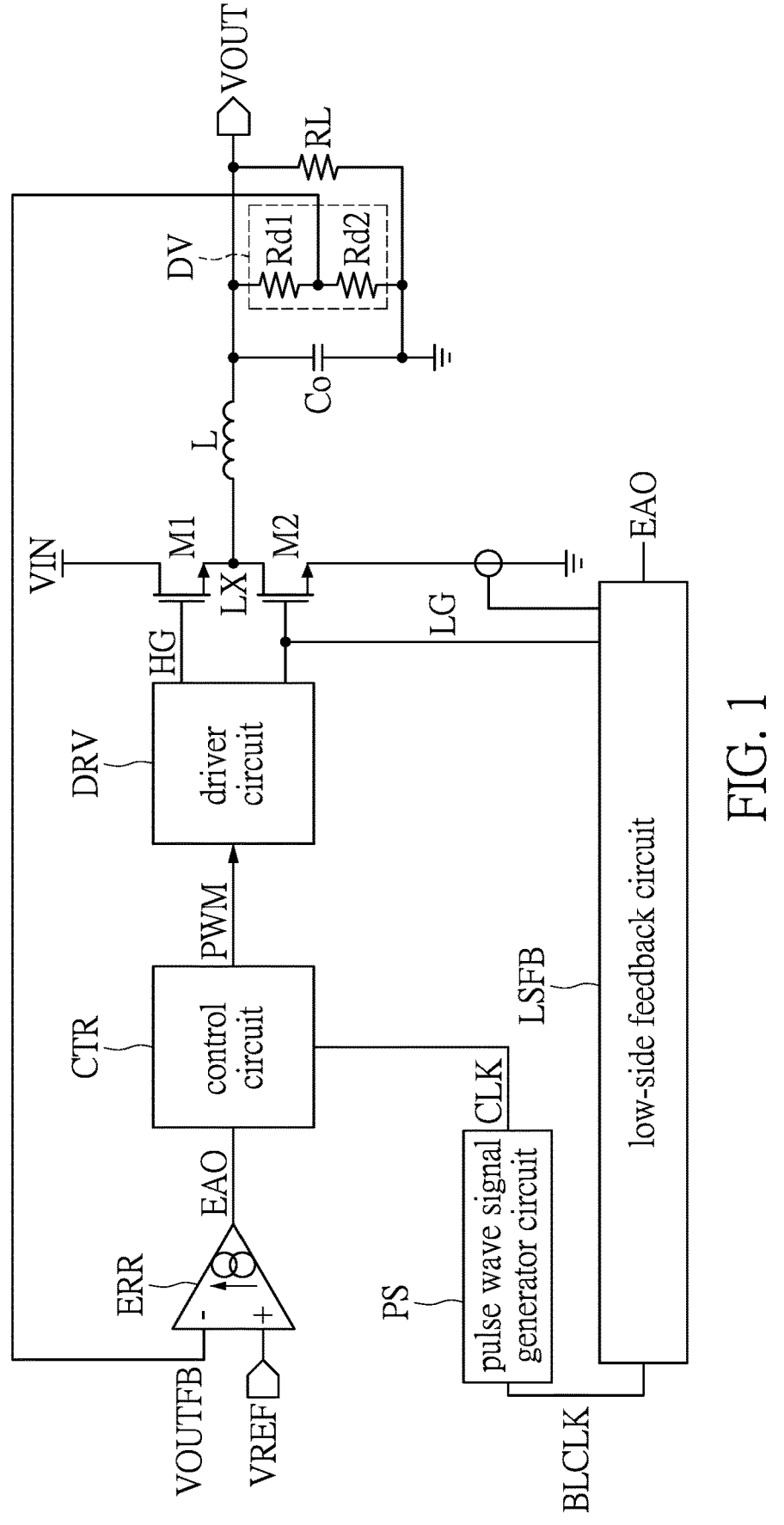
FIG. 1 is a circuit diagram of a power converter having a stable output voltage according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter having a stable output voltage according to a first embodiment of the present disclosure.

In the first embodiment, the power converter of the present disclosure includes a high-side switch M1, a low-side switch M2, an error amplifier ERR, a low-side feedback circuit LSFB, a pulse wave signal generator circuit PS, a control circuit CTR and a driver circuit DRV.

A first end of the high-side switch M1 is coupled to an input voltage VIN. A first end of the low-side switch M2 is connected to a second end of the high-side switch M1. A second end of the low-side switch M2 is grounded. A node LX between the first end of the low-side switch M2 and the second end of the high-side switch M1 is connected to a first end of an inductor L. A second end of the inductor L is connected to a first end of an output capacitor Co. A second end of the output capacitor Co is grounded. The first end of the output capacitor Co can also be connected to the first end of the inductor L. A second end of an output resistor RL is grounded.

The node between the first end of the output capacitor Co and the second end of the inductor L is used as the output end of the power converter of the present disclosure. The voltage of the node between the first end of the output capacitor Co and the second end of the inductor L is used as an output voltage VOUT of the power converter of the present disclosure.

A first input end of the error amplifier ERR, such as the inverting input end (through the voltage divider circuit DV as shown in FIG. 1), is connected to the node between the first end of the output capacitor Co and the second end of the inductor L. A second input end of the error amplifier ERR, such as the non-inverting input end, is coupled to a reference voltage VREF.

The voltage divider circuit DV may include a first voltage divider resistor Rd1 and a second voltage divider resistor Rd2. A first end of the first voltage divider resistor Rd1 is used as an input end of the voltage divider circuit DV and is connected to the first end of the output capacitor Co. A first end of the second voltage divider resistor Rd2 is used as an output end of the voltage divider circuit DV and is connected to a second end of the first voltage divider resistor Rd1 and the first input end of the error amplifier ERR, such as the inverting input end. A second end of the second voltage divider resistor Rd2 is grounded.

The low-side feedback circuit LSFB is connected to a node between the second end of the low-side switch M2 and ground, and is connected to a control end of the low-side switch M2 and an output end of the error amplifier ERR.

The pulse wave signal generator circuit PS is connected to the low-side feedback circuit LSFB. The control circuit CTR is connected to the pulse wave signal generator circuit PS. The driver circuit DRV is connected to the control circuit CTR, a control end of the high-side switch M1 and the control end of the low-side switch M2.

As shown in FIG. 1, the output voltage VOUT of the power converter of the present disclosure (that is, the voltage of the node between the first end of the output capacitor Co and the second end of the inductor L) is divided by the voltage divider circuit DV to generate a divided voltage, which is transmitted as an output feedback voltage VOUTFB to the first input end of the error amplifier ERR, such as the inverting input end.

It should be understood that the voltage divider circuit DV is an optional component, and the present disclosure is not limited thereto. In practice, the voltage divider circuit DV can also be omitted in the power converter of the present disclosure. In this case, the output voltage VOUT of the power converter of the present disclosure is transmitted as the output feedback voltage VOUTFB to the first input end of the error amplifier ERR, such as the inverting input end.

The error amplifier ERR multiplies the difference between a divided voltage of the output voltage VOUT of the power converter of the present disclosure and a reference voltage VREF by a gain to output an error amplification signal EAO.

It is worth noting that the low-side feedback circuit LSFB sets a level of a pulse wave of a blank clock signal BLCLK according to the voltage signal received at the second end of the low-side switch M2 each time, the low-side drive signal LG of the control end of the low-side switch M2, and the error amplification signal EAO received from the output end of the error amplifier ERR and then sets a width of the pulse wave of the blank clock signal BLCLK. The low-side feedback circuit LSFB outputs the blank clock signal BLCLK.

The pulse wave signal generator circuit PS sets a frequency of a clock signal CLK according to the blank clock signal BLCLK received from the low-side feedback circuit LSFB, and outputs the clock signal CLK.

The control circuit CTR outputs a control signal PWM according to the clock signal CLK received from the pulse wave signal generator circuit PS and the error amplification signal EAO received from the output end of the error amplifier ERR.

For example, the control circuit CTR can modulate a pulse wave width modulation according to the clock signal CLK received from the pulse wave signal generator circuit PS and the error amplification signal EAO received from the output end of the error amplifier ERR, and outputs the pulse wave width modulation signal as a control signal PWM.

The driver circuit DRV outputs a high-side drive signal HG to the control end of the high-side switch M1 and a low-side drive signal LG to the control end of the low-side switch M2 according to the control signal PWM received from the control circuit CTR to drive the high-side switch M1 and the low-side switch M2.

Figure 2:
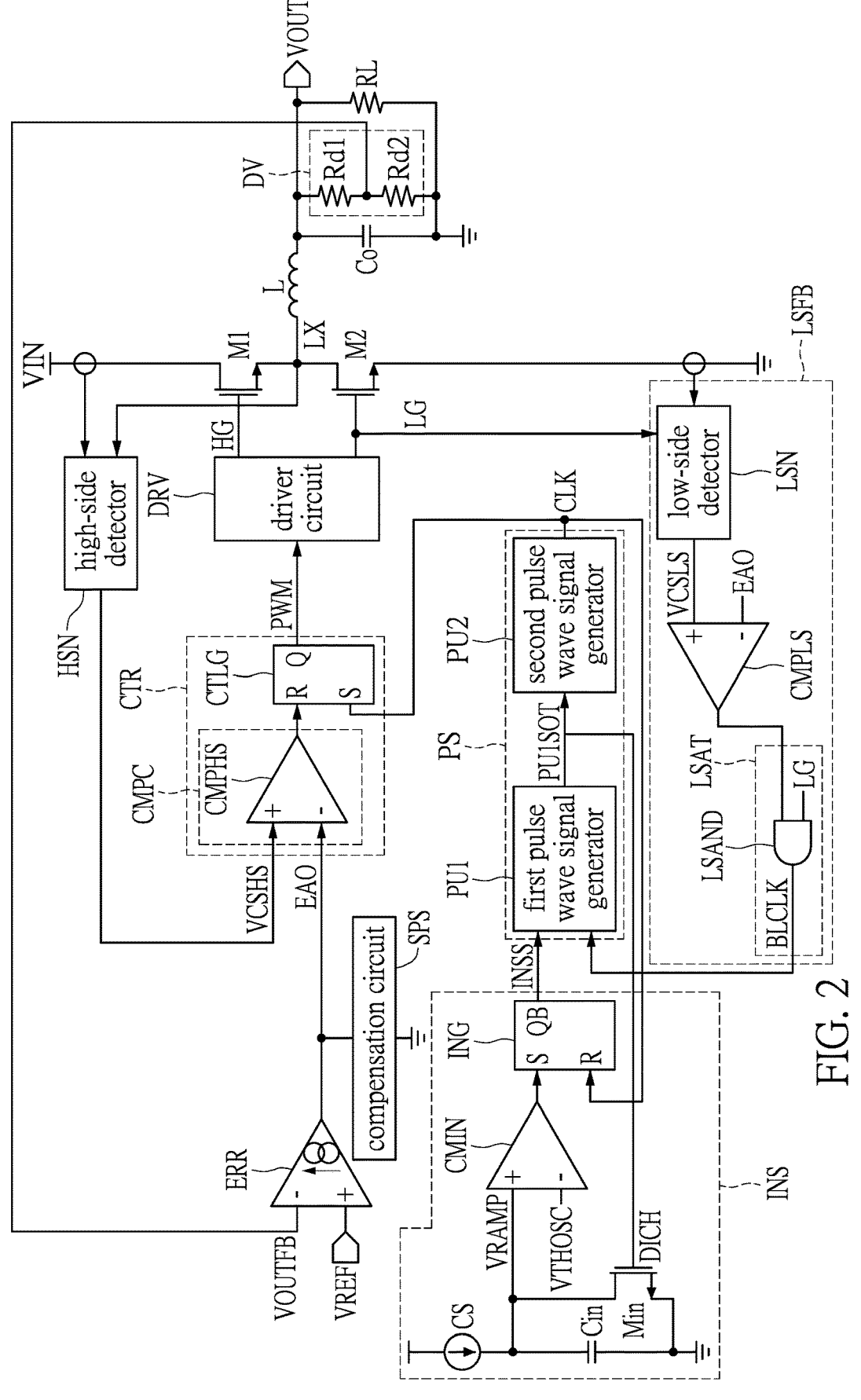
FIG. 2 is a circuit diagram of a power converter having a stable output voltage according to a second embodiment of the present disclosure.
Figure 3:
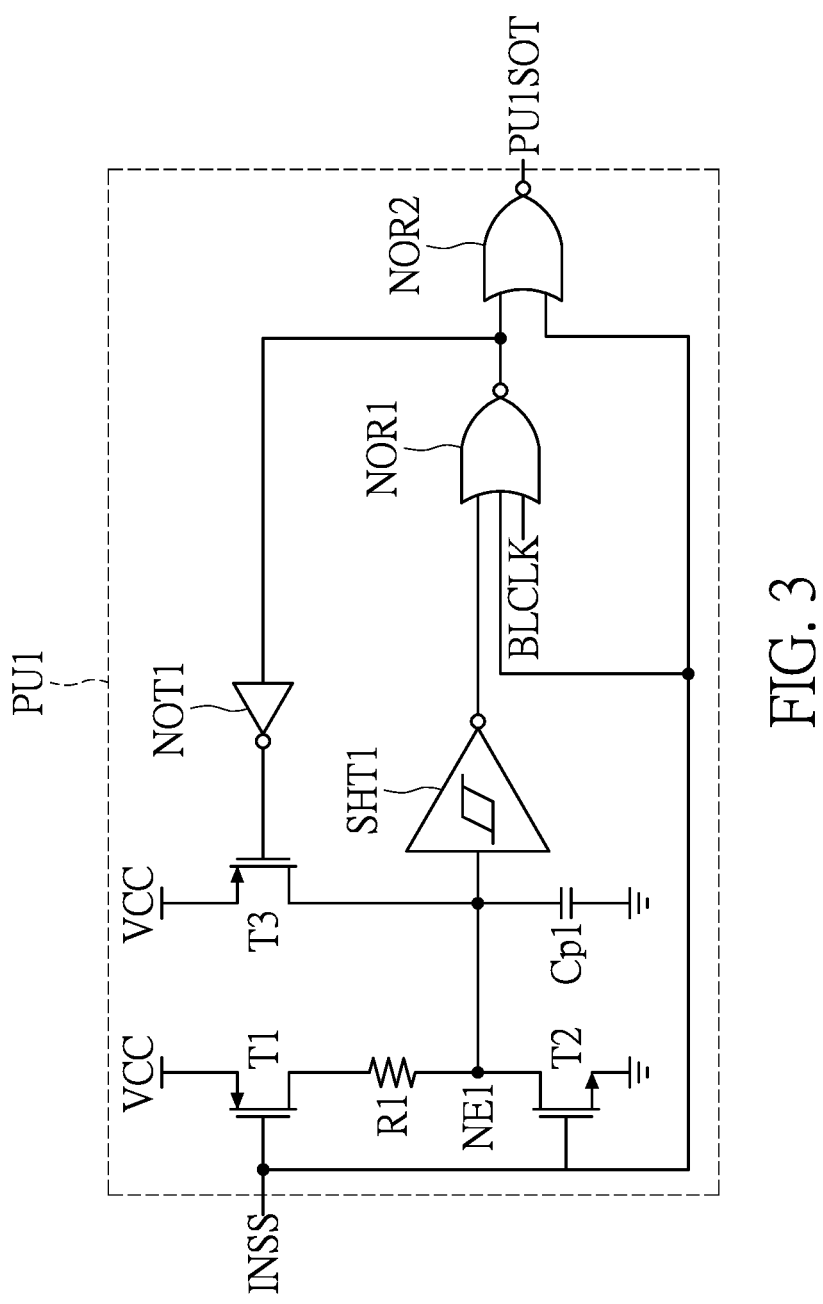
FIG. 3 is a circuit diagram of a first pulse wave signal generator of a power converter having a stable output voltage according to a third embodiment of the present disclosure.
Figure 5:
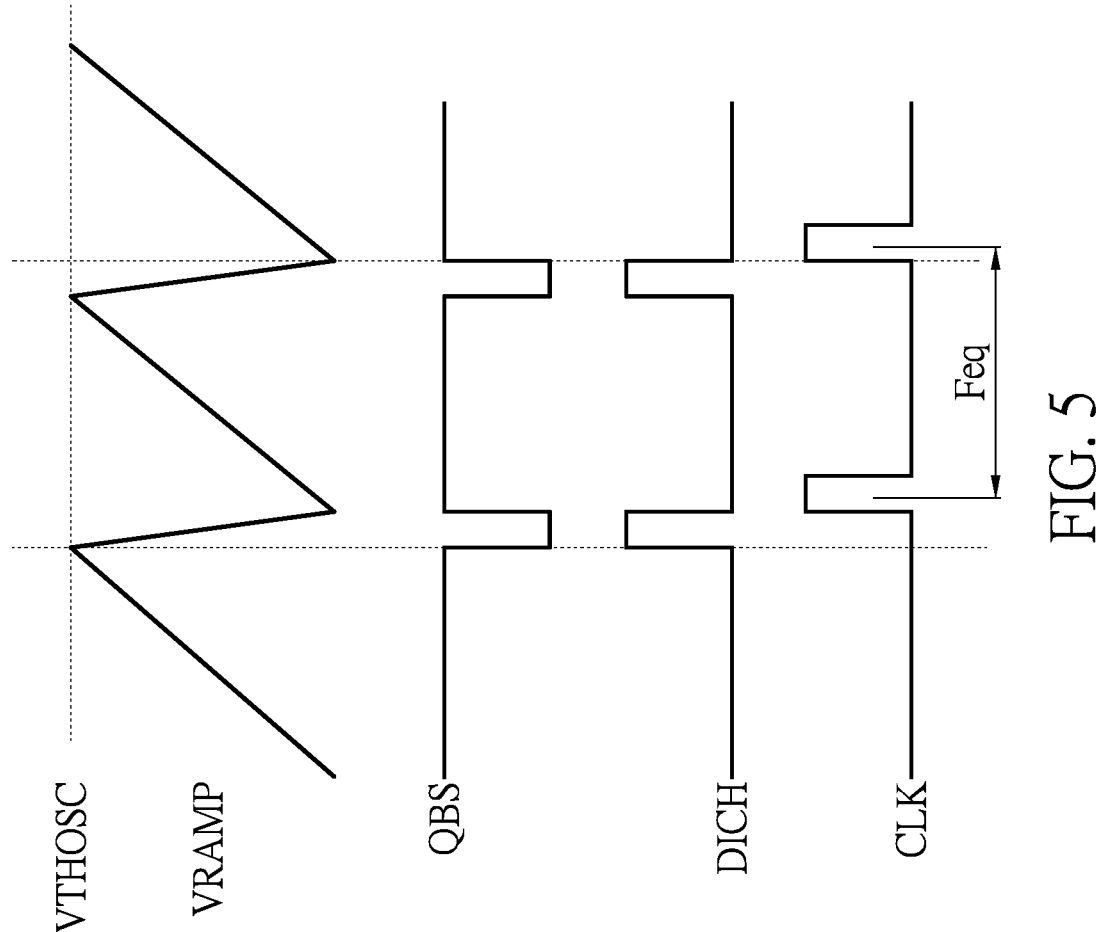
FIG. 5 is a waveform diagram of a signal of a power converter having a stable output voltage according to the second embodiment of the present disclosure.
Figure 6:
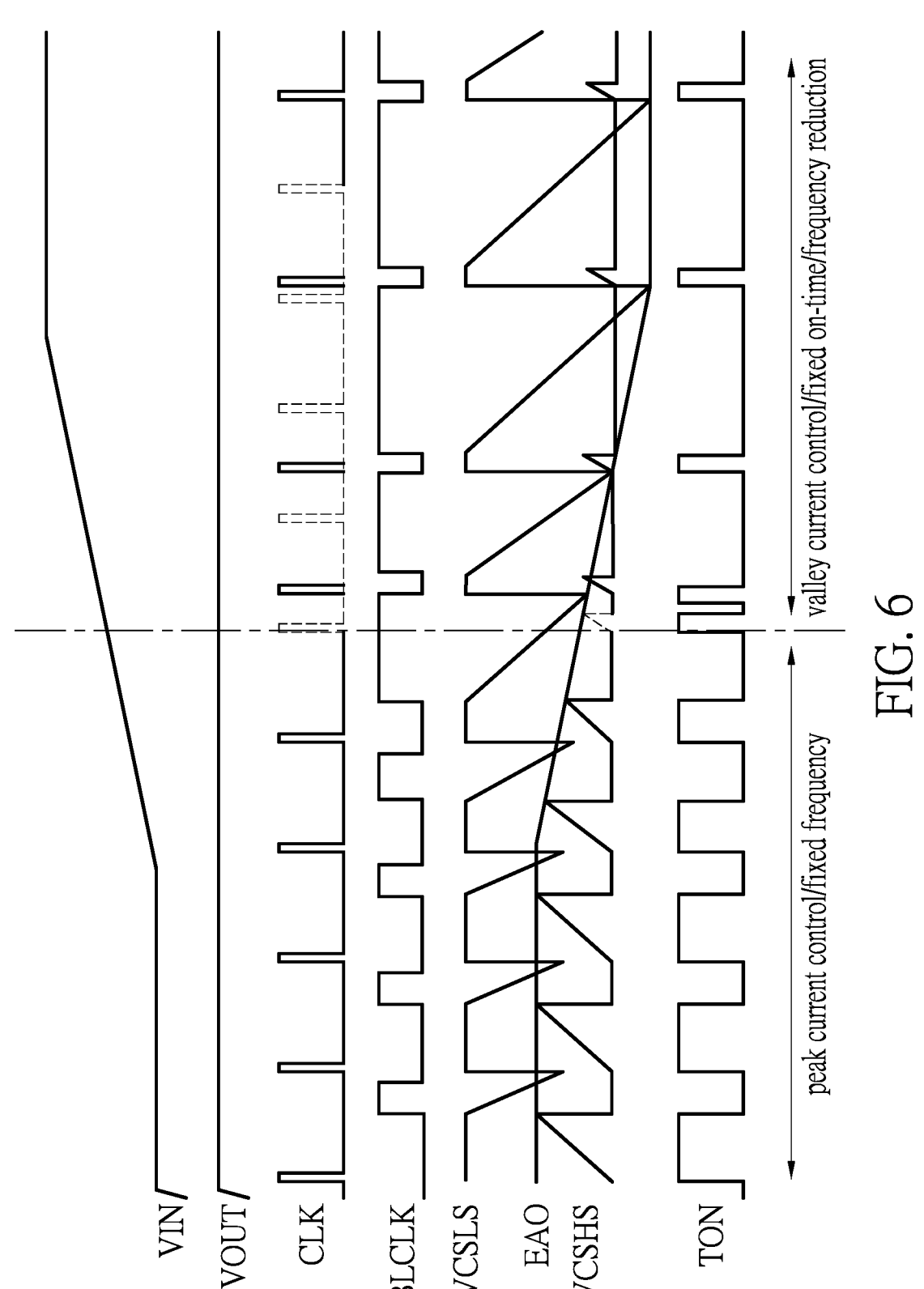
FIG. 6 is a waveform diagram of a signal of a power converter having a stable output voltage according to the second embodiment of the present disclosure.
Figure 7:
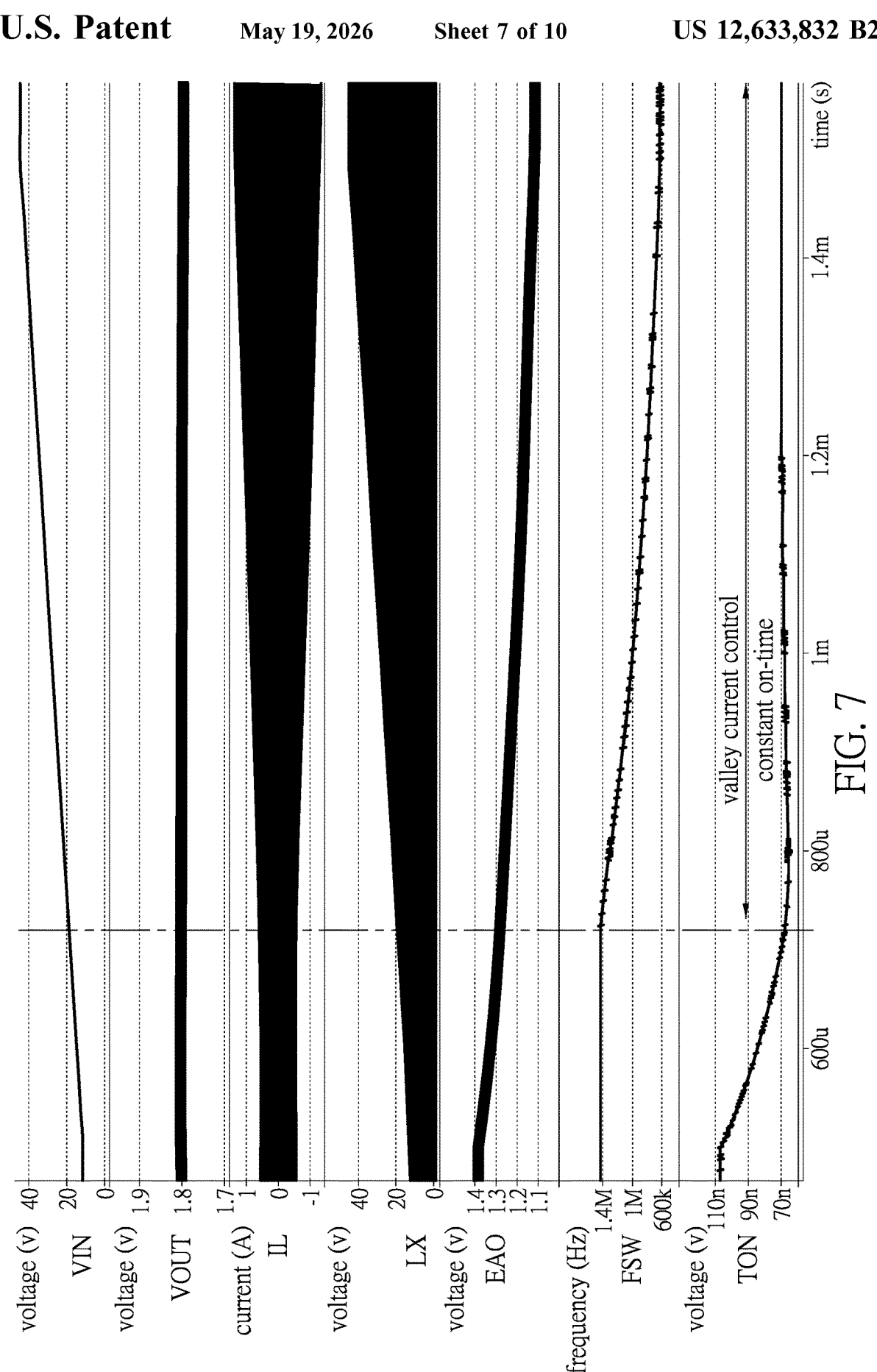
FIG. 7 is a waveform diagram of a signal of a power converter having a stable output voltage according to the second embodiment of the present disclosure.

Reference is made to FIGS. 2, 3 and 5 to 7. FIG. 2 is a circuit diagram of a power converter having a stable output voltage according to the second embodiment of the present disclosure, FIG. 3 is a circuit diagram of a first pulse wave signal generator of a power converter having a stable output voltage according to a third embodiment of the present disclosure, and FIGS. 5 to 7 are waveform diagrams of a signal of a power converter having a stable output voltage according to the second embodiment of the present disclosure.

In addition to the high-side switch M1, the low-side switch M2, the error amplifier ERR, the low-side feedback circuit LSFB, the pulse wave signal generator circuit PS, the control circuit CTR and the driver circuit DRV, the power converter of the present disclosure can further include a pulse wave reference input circuit INS, a compensation circuit SPS or a combination thereof as shown in FIG. 2.

The similarities between the second embodiment of the present disclosure and the first embodiment of the present disclosure will not be described again below.

In the second embodiment, as shown in FIG. 2, for example, the low-side feedback circuit LSFB may include a low-side detector LSN, a low-side comparator CMPLS, and a frequency modulation determination circuit LSAT. The pulse wave signal generator circuit PS may include a first pulse wave signal generator PU1 and a second pulse wave signal generator PU2.

The low-side detector LSN is connected to a node between the second end of the low-side switch M2 and ground.

The low-side comparator CMPLS is a comparator. A first input end of the low-side comparator CMPLS, such as the non-inverting input end, is connected to the low-side detector LSN. A second input end of the low-side comparator CMPLS, such as the inverting input end, is connected to the output end of the error amplifier ERR.

The frequency modulation determination circuit LSAT is connected to an output end of the low-side comparator CMPLS, the control end of the low-side switch M2 and the first pulse wave signal generator PU1 of the pulse wave signal generator circuit PS.

The frequency modulation determination circuit LSAT may include one or more logic components according to actual application requirements. If the non-inverting input end of the low-side comparator CMPLS is connected as the first input end to the low-side detector LSN, the inverting input end of the low-side comparator CMPLS is connected as the second input end to the output end of the error amplifier ERR, and the low-side switch M2 uses an n-type metal oxide semiconductor field effect transistor (NMOS) and is turned on with a high-level low-side drive signal LG, the frequency modulation determination circuit LSAT can include an AND gate LSAND as shown in FIG. 2. This is only an example, and the present disclosure is not limited thereto.

The first input end of the AND gate LSAND is connected to the output end of the low-side comparator CMPLS. The second input end of the AND gate LSAND is connected to the control end of the low-side switch M2. The output end of the AND gate LSAND is connected to the first input end of the first pulse wave signal generator PU1 of the pulse wave signal generator circuit PS.

A second input end of the first pulse wave signal generator PU1 of the pulse wave signal generator circuit PS can be connected to an output end of the pulse wave reference input circuit INS.

The pulse wave reference input circuit INS may include a comparator used as an input comparator CMIN, and may include an input diverter switch Min, a ramp signal generator circuit and an input logic circuit. The ramp signal generator circuit may include a current source CS and an input capacitor Cin, and the input logic circuit may include a flip-flop used as an input flip-flop ING (such as but not limited to an SR flip-flop).

In the ramp signal generator circuit, the current source CS is connected to a first end of the input capacitor Cin. A second end of the input capacitor Cin is grounded. A first input end of the input comparator CMIN, such as the non-inverting input end, is connected to the first end of the input capacitor Cin of the ramp signal generator circuit. A second input end of the input comparator CMIN is connected to an oscillation circuit (not shown in the figures).

An output end of the input comparator CMIN is connected to a second input end S of the input flip-flop ING. A first input end R of the input flip-flop ING is connected to an output end of the second pulse wave signal generator PU2 of the pulse wave signal generator circuit PS. An inverting output end QB of the input flip-flop ING is connected to an input end of the first pulse wave signal generator PU1 of the pulse wave signal generator circuit PS.

The first pulse wave signal generator PU1 of the pulse wave signal generator circuit PS is connected to an input end of the second pulse wave signal generator PU2 of the pulse wave signal generator circuit PS and a control end of the input diverter switch Min.

A first end of the input diverter switch Min is connected to the first end of the input capacitor Cin and the first input end of the input comparator CMIN. A second end of the input diverter switch Min is grounded.

The control circuit CTR may include a comparison circuit CMPC and a control logic circuit. The comparison circuit CMPC may include a comparator used as a high-side comparator CMPHS, and the control logic circuit may include a flip-flop used as a control flip-flop CTLG.

An input end of the high-side detector HSN is connected to the first end of the high-side switch M1 and the second end of the high-side switch M1. The first input end, such as the non-inverting input end, of the high-side comparator CMPHS of the control circuit CTR is connected to an output end of the high-side detector HSN.

A second input end, such as the inverting input end, of the high-side comparator CMPHS of the control circuit CTR is connected to the output end of the error amplifier ERR.

The compensation circuit SPS may be connected to a node between the output end of the error amplifier ERR and the second input end, such as the inverting input end, of the high-side comparator CMPHS of the control circuit CTR.

A first input end R of the control flip-flop CTLG of the control circuit CTR is connected to an output end of the high-side comparator CMPHS. A second input end S of the control flip-flop CTLG of the control circuit CTR is connected to the output end of the second pulse wave signal generator PU2 of the pulse wave signal generator circuit PS. An output end Q of the control flip-flop CTLG of the control circuit CTR is connected to an input end of the driver circuit DRV.

The driver circuit DRV outputs the high-side drive signal HG to the control end of the high-side switch M1 to drive the high-side switch M1, and the driver circuit DRV outputs the low-side drive signal LG to the control end of the low-side switch M2 to drive the low-side switch M2.

The high-side detector HSN detects the current at the first end of the high-side switch M1 and converts a detected current at the first end of the high-side switch M1 into a voltage to output a high-side detecting voltage signal.

The error amplifier ERR uses a divided voltage of the output voltage VOUT of the power converter of the present disclosure as an output feedback voltage VOUTFB, and multiplies the difference between the output feedback voltage VOUTFB and the reference voltage VREF by a gain to output the error amplification signal EAO.

If necessary, the compensation circuit SPS can compensate the error amplification signal EAO output from the output end of the error amplifier ERR, and output a compensated error amplification signal EAO to the second input end, such as the inverting input end, of the high-side comparator CMPHS of the control circuit CTR.

The first input end, such as the non-inverting input end, of the high-side comparator CMPHS of the control circuit CTR receives a high-side detecting voltage signal VCSHS from the output end of the high-side detector HSN. The second input end, such as the inverting input end, of the high-side comparator CMPHS receives an error amplification signal EAO from the output end of the error amplifier ERR or from the compensation circuit SPS.

The high-side comparator CMPHS compares the voltage of the high-side detecting voltage signal VCSHS with the voltage of the error amplification signal EAO to output a high-side comparison signal.

The low-side detector LSN detects the current at the second end of the low-side switch M2 and converts the detected current at the second end of the low-side switch M2 into a voltage to output a low-side detecting voltage signal VCSLS. The first input end, such as the non-inverting input end, of the low-side comparator CMPLS receives the low-side detecting voltage signal VCSLS from the low-side detector LSN. The second input end, such as the inverting input end, of the low-side comparator CMPLS receives the error amplification signal EAO from the output end of the error amplifier ERR.

The low-side comparator CMPLS compares the voltage of the low-side detecting voltage signal VCSLS with the voltage of the error amplification signal EAO to output a low-side comparison signal.

The AND gate LSAND of the frequency modulation determination circuit LSAT outputs the blank clock signal BLCLK according to the low-side comparison signal received from the output end of the low-side comparator CMPLS and the low-side drive signal LG received from the control end of the low-side switch M2 (or the output end of the driver circuit DRV).

When the low-side comparison signal received by the first input end of the AND gate LSAND of the frequency modulation determination circuit LSAT is at a high level, and the low-side drive signal LG received by the second input end of the AND gate LSAND is at a high level, so that the low-side switch M2 is turned on, the AND gate LSAND outputs a high-level blank clock signal BLCLK.

On the other hand, in the pulse wave reference input circuit INS, the current source CS supplies an input current to the input capacitor Cin to charge the input capacitor Cin. The voltage signal of the input capacitor Cin is transmitted as a ramp signal VRAMP to a first input end, such as a non-inverting input end, of an input comparator CMIN. The second input end, such as the inverting input end, of the input comparator CMIN receives an oscillation signal VTHOSC from an oscillation circuit.

The input comparator CMIN compares the voltage of a received ramp signal VRAMP with the voltage of an oscillation signal VTHOSC to output an input comparison signal.

The input flip-flop ING of the pulse wave reference input circuit INS outputs a pulse wave reference input signal INSS according to the input comparison signal received from the output end of the input comparator CMIN and the clock signal CLK received from the second pulse wave signal generator PU2 of the pulse wave signal generator circuit PS.

As shown in FIG. 5, during the charging process of the input capacitor Cin, a voltage signal of the input capacitor Cin used as a ramp signal VRAMP gradually rises. When the voltage of the ramp signal VRAMP rises to be equal to or higher than the voltage of the oscillation signal VTHOSC, the input comparator CMIN of the pulse wave reference input circuit INS outputs a high-level input comparison signal, such that an input inverting logic signal QBS output from the inverting output end QB of the input flip-flop ING is switched from a high level to a low level.

Whenever the first pulse wave signal generator PU1 of the pulse wave signal generator circuit PS receives the input inverting logic signal QBS from the input flip-flop ING, as shown in FIG. 5, the first pulse wave signal generator PU1 of the pulse wave signal generator circuit PS generates a pulse wave in an input diverter switch switching signal DICH output to the control end of the input diverter switch Min.

Whenever the charging of the input capacitor Cin is completed, the first pulse wave signal generator PU1 of the pulse wave signal generator circuit PS can output a high-level input diverter switch switching signal DICH to the control end of the input diverter switch Min to turn on the input diverter switch Min so as to discharge the input capacitor Cin.

The first pulse wave signal generator PU1 of the pulse wave signal generator circuit PS outputs a first pulse wave signal PU1SOT according to the pulse wave reference input signal INSS received from the input flip-flop ING of the pulse wave reference input circuit INS and the blank clock signal BLCLK received from the AND gate LSAND of the frequency modulation determination circuit LSAT.

The second pulse wave signal generator PU2 of the pulse wave signal generator circuit PS outputs the clock signal CLK to the second input end S of the control flip-flop CTLG of the control circuit CTR according to the first pulse wave signal PU1SOT received from the first pulse wave signal generator PU1.

As shown in FIG. 5, whenever the input capacitor Cin is discharged, the second pulse wave signal generator PU2 can output a pulse reset signal to the first input end R of the input flip-flop ING (such as but not limited to an SR flip-flop) to reset an input flip-flop ING.

The second pulse wave signal generator PU2 of the pulse wave signal generator circuit PS switches the clock signal CLK from a low level at a time point of the input diverter switch switching signal DICH (that is, the time point at which the discharge of the input capacitor Cin ends), and from this point, the next pulse wave starts being generated by the clock signal CLK. At the time, the frequency of the pulse wave of the clock signal CLK is calculated by the following equation:

$$Feq = I1/[C \text{ in} \times (Vosc)];$$

in which, Feq represents the frequency of the pulse wave of the clock signal CLK, I1 represents the input current supplied by the current source CS, Cin represents an input capacitor Cin, and Vosc represents the voltage of the oscillation signal VTHOSC.

The control flip-flop CTLG of the control circuit CTR outputs the control signal PWM according to the high-side comparison signal received from the output end of the high-side comparator CMPHS and the clock pulse CLK received from the second pulse wave signal generator PU2 of the pulse wave signal generator circuit PS.

The driver circuit DRV outputs the high-side drive signal HG to the control end of the high-side switch M1 and the low-side drive signal LG to the control end of the low-side switch M2 according to the control signal PWM received from the control circuit CTR.

During the working cycle of the on-time signal TON as shown in FIG. 6 (i.e., a signal at the node LX between the first end of the low-side switch M2 and the second end of the high-side switch M1 as shown in FIG. 2, or in practice, the high-side drive signal of the high-side switch M1), the driver circuit DRV as shown in FIG. 2 turns on the high-side switch M1 and simultaneously turns off the low-side switch M2. On the contrary, during the non-working period of the on-time signal TON as shown in FIG. 6, the driver circuit DRV as shown in FIG. 2 turns off the high-side switch M1 and simultaneously turns on the low-side switch M2.

As shown in FIG. 6, whenever the low-side switch M2 is turned on during a non-working period of the on-time signal TON and the voltage of the voltage signal at the second end of the low-side switch M2 is higher than the voltage of the error amplification signal EAO, the output end of the AND gate LSAND) of the frequency modulation determination circuit LSAT of the low-side feedback circuit LSFB outputs a high-level blank clock signal BLCLK.

When the duty cycle of the on-time signal TON is greater than a minimum on-time of the high-side switch M1, there is no need to reduce the switching frequency FSW of the high-side switch M1 and the low-side switch M2. At the time, as shown in FIG. 6, the clock signal CLK is a constant frequency signal, and the frequency of each of the plurality of pulse waves of the clock signal CLK is fixed to a preset reference frequency.

As shown in FIGS. 6 and 7, when the input voltage VIN gradually increases, the duty cycle of the on-time signal TON gradually shortens. When the duty cycle of the on-time signal TON is shortened to be equal to a minimum on-time, the error amplification signal EAO output by the error amplifier ERR gradually decreases. As a result, the width of the pulse wave generated later among the plurality of pulse waves of the blank clock signal BLCLK output by the AND gate LSAND of the frequency modulation determination circuit LSAT of the low-side feedback circuit LSFB is greater.

When the low-side switch M2 is turned on and the voltage of the voltage signal at the second end of the low-side switch M2 is higher than the voltage of the error amplification signal EAO, the AND gate LSAND of the frequency modulation determination circuit LSAT of the low-side feedback circuit LSFB outputs a high-level blank clock signal BLCLK. On the contrary, when the low-side switch M2 is turned off or the voltage signal at the second end of the low-side switch M2 is not higher than the voltage of the error amplification signal EAO, the AND gate LSAND of the frequency modulation determination circuit LSAT of the low-side feedback circuit LSFB outputs a low-level blank clock signal BLCLK.

When a predetermined generation time point of the pulse wave of the clock signal CLK falls into a time interval in which the blank clock signal BLCLK is at a high level, the pulse wave signal generator circuit PS delays the generation of the pulse wave of the clock signal CLK to reduce the frequency of the pulse wave in the clock signal CLK, thereby reducing the switching frequency FSW of the high-side switch M1 and the low-side switch M2.

As shown in FIGS. 6 and 7, when the input voltage VIN coupled to the first end of the high-side switch M1 of the power converter of the present disclosure gradually rises and the duty cycle of the on-time signal TON of the power converter of the present disclosure (i.e., the on-time of the high-side switch M1) is shortened to be equal to a minimum on-time of the high-side switch M1 of the power converter of the present disclosure, the switching frequency FSW of the high-side switch M1 and the low-side switch M2 decreases linearly, so that the output voltage VOUT of the power converter of the present disclosure is maintained at a constant voltage value without overvoltage occurring.

Figure 4:
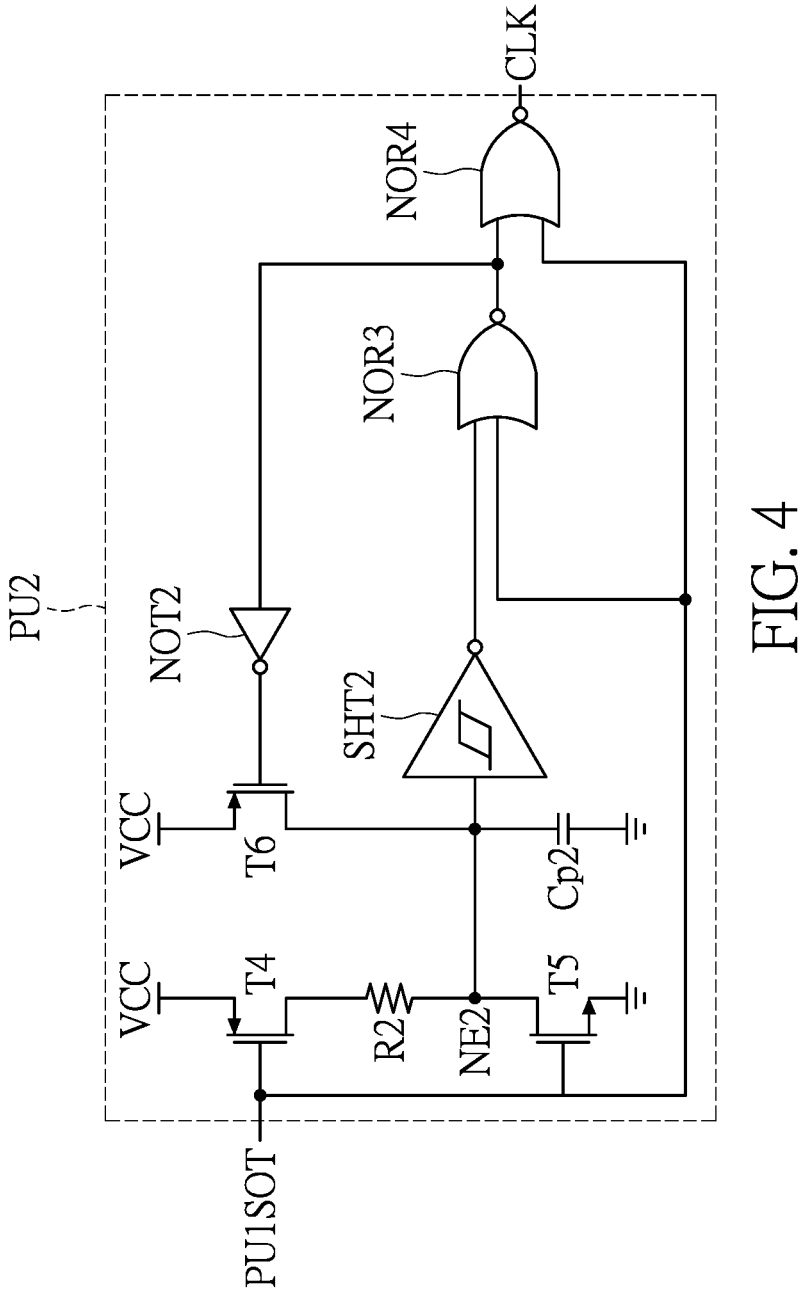
FIG. 4 is a circuit diagram of a second pulse wave signal generator of a power converter having a stable output voltage according to the third embodiment of the present disclosure.
Figure 8:
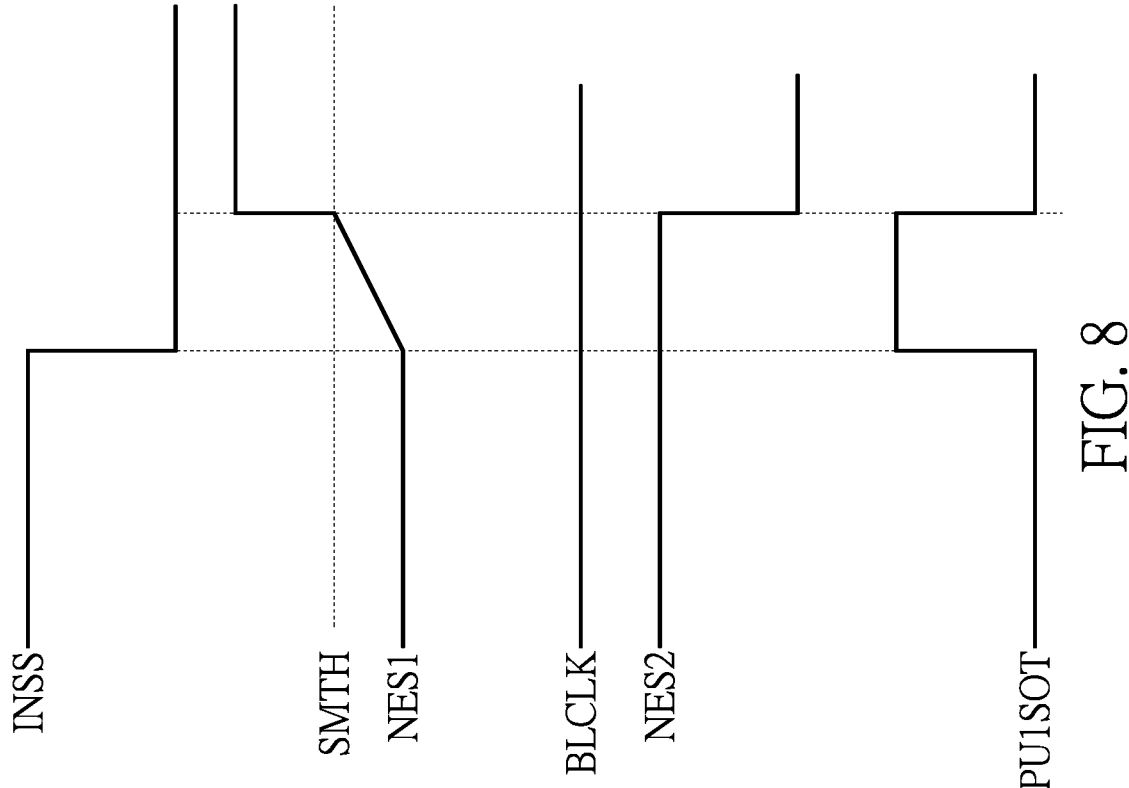
FIG. 8 is a waveform diagram of a signal of a power converter having a stable output voltage according to the third embodiment of the present disclosure.
Figure 9:
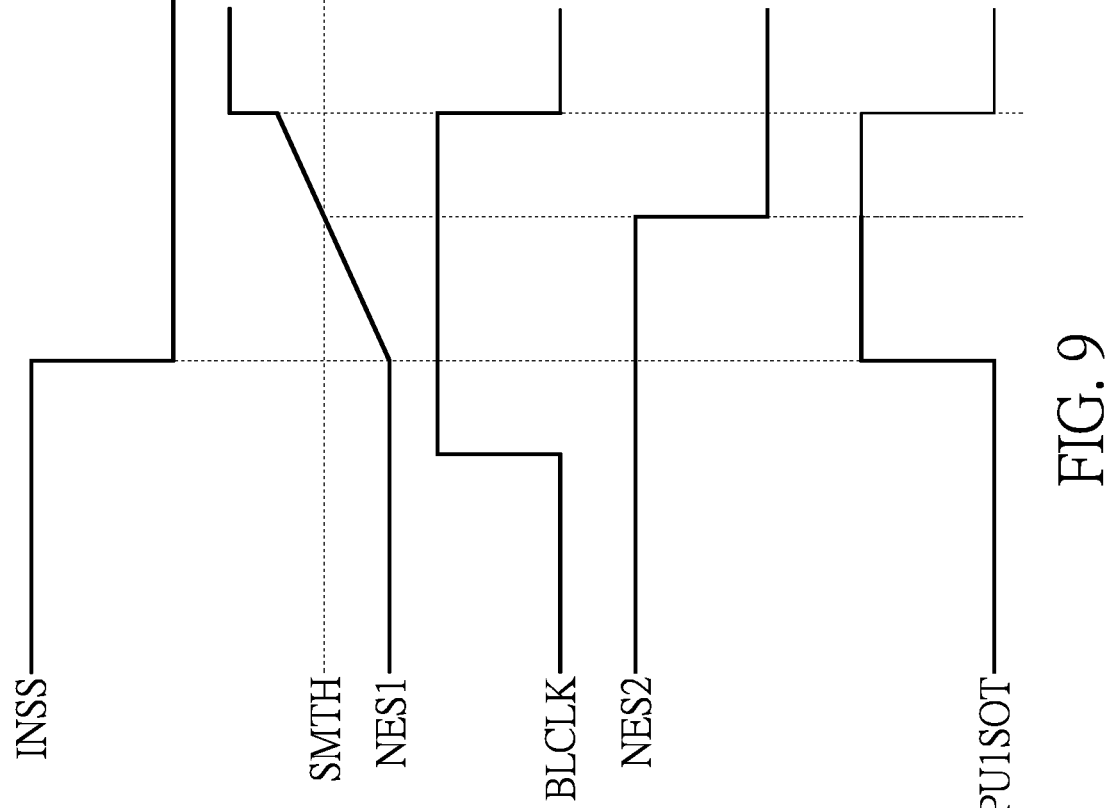
FIG. 9 is a waveform diagram of a signal of a power converter having a stable output voltage according to the third embodiment of the present disclosure.

Reference is made to FIGS. 3, 4, 8 and 9. FIG. 3 is a circuit diagram of a first pulse wave signal generator of a power converter having a stable output voltage according to a third embodiment of the present disclosure, FIG. 4 is a circuit diagram of a second pulse wave signal generator of a power converter having a stable output voltage according to the third embodiment of the present disclosure, and FIG. 8 and FIG. 9 are waveform diagrams of a signal of a power converter having a stable output voltage according to the third embodiment of the present disclosure.

For example, the first pulse wave signal generator PU1 of the pulse wave signal generator circuit PS As shown in FIG. 2 of the present application may include a first transistor T1, a first resistor R1, a second transistor T2, a third transistor T3, a first Schmitt trigger SHT1, a first NOR gate NOR1, a second NOR gate NOR2, a first NOT gate NOT1 and a first capacitor Cp1 as shown in FIG. 3.

As shown in FIG. 3, a first end of the first transistor T1 is coupled to a common voltage VCC. A second end of the first transistor T1 is connected to a first end of the first resistor R1. A second end of the first resistor R1 is connected to a first end of the second transistor T2. A second end of the second transistor T2 is grounded.

A control end of the first transistor T1 and a control end of the second transistor T2 are connected to an output end Q of the input flip-flop ING of the pulse wave reference input circuit INS to receive the pulse wave reference input signal INSS from the output end Q of the input flip-flop ING of the pulse wave reference input circuit INS.

A first end of the third transistor T3 is coupled to the common voltage VCC.

An input end of the first Schmitt trigger SHT1 is connected to the node NE1 between the first end of the second transistor T2 and the second end of the first resistor R1, and is connected to a second end of the third transistor T3 and a first end of the first capacitor Cp1. A second end of the first capacitor Cp1 is grounded.

A first input end of the first NOR gate NOR1 is connected to an output end of the first Schmitt trigger SHT1. A second input end of the first NOR NOR1 is connected to the output end Q of the input flip-flop ING of the pulse wave reference input circuit INS to receive the pulse wave reference input signal INSS from the pulse wave reference input circuit INS. A third input end of the first NOR gate NOR1 is connected to the AND gate LSAND of the frequency modulation determination circuit LSAT of the low-side feedback circuit LSFB, and the AND gate LSAND of the frequency modulation determination circuit LSAT receives the blank clock signal BLCLK.

A first input end of the second NOR gate NOR2 is connected to an output end of the first NOR gate NOR1. A second input end of the second inverter NOR2 is connected to the output end Q of the input flip-flop ING of the pulse wave reference input circuit INS to receive the pulse wave reference input signal INSS from the pulse wave reference input circuit INS. An output end of the second NOR gate NOR2 is connected to the input end of the second pulse wave signal generator PU2 of the pulse wave signal generator circuit PS.

An input end of the first NOT gate NOT1 is connected to the output end of the first NOR gate NOR1. An output end of the first NOT gate NOT1 is connected to a control end of the third transistor T3.

For example, the second pulse wave signal generator PU2 of the pulse wave signal generator circuit PS As shown in FIG. 2 of the present application may include a fourth transistor T4, a second resistor R2, and a fifth transistor T5, a sixth transistor T6, a second Schmitt trigger SHT2, a third NOR gate NOR3, a fourth NOR gate NOR4, a second NOT gate NOT2 and a second capacitor Cp2 as shown in FIG. 4.

As shown in FIG. 4, a first end of the fourth transistor T4 is coupled to the common voltage VCC. A control end of the fourth transistor T4 as shown in FIG. 4 is connected to the output end of the second NOR gate NOR2 of the first pulse wave signal generator PU1 as shown in FIG. 3.

A second end of the fourth transistor T4 is connected to the first end of the second resistor R2. The second end of the second resistor R2 is connected to a first end of the fifth transistor T5. A control end of the fifth transistor T5 is connected to an output end of the second inverter NOR2 of the first pulse wave signal generator PU1 as shown in FIG. 3. The second end of the fifth transistor T5 is grounded.

A first end of the sixth transistor T6 is coupled to the common voltage VCC.

An input end of the second Schmitt trigger SHT2 is connected to the node NE2 (the second voltage signal NES2 of the node N E2 changes as shown in FIG. 7 or FIG. 8) between the first end of the fifth transistor T5 and the second end of the second resistor R2, and connected to a second end of the sixth transistor T6 and a first end of the second capacitor Cp2. A second end of the second capacitor Cp2 is grounded.

A first input end of the third NOR gate NOR3 is connected to an output end of the second Schmitt trigger SHT2. A second input end of the third NOR gate NOR3 is connected to the output end of the second NOR gate NOR2 of the first pulse wave signal generator PU1 as shown in FIG. 3.

A first input end of the fourth NOR gate NOR4 is connected to an output end of the third NOR gate NOR3. A second input end of the fourth NOR gate NOR4 is connected to the output end of the second NOR gate NOR2 of the first pulse wave signal generator PU1 as shown in FIG. 3. An output end of the fourth inverter NOR4 is connected to the second input end S of the control flip-flop CTLG of the control circuit CTR.

An input end of the second NOT gate NOT2 is connected to the output end of the third NOR gate NOR3. An output end of the second NOT gate NOT2 is connected to a control end of the sixth transistor T6.

As shown in FIG. 8, when the pulse wave reference input signal INSS changes from a high level to a low level, since the first voltage signal NES1 at the node NE1 between the first end of the second transistor T2 and the second end of the first resistor R1 is at a low level, the first Schmitt trigger SHT1 outputs a high-level first Schmidt trigger signal.

When the first input end of the first NOR gate NOR1 receives the high-level first Schmitt trigger signal from the output end of the first Schmitt trigger SHT1, the second input end of the first NOR gate NOR1 receives a low-level pulse wave reference input signal INSS, the third input end of the first NOR gate NOR1 receives a low-level blank clock signal BLCLK, and the output end of the first NOR gate NOR1 outputs a low-level first NOR gate signal.

When the first input end of the second NOR gate NOR2 receives the low-level first NOR gate signal from the output end of the first NOR gate NOR1 and the second input end of the second NOR gate NOR2 receives the low-level pulse wave reference input signal INSS from the pulse wave reference input circuit INS, the output end of the second NOR gate NOR2 outputs a high-level first pulse wave signal PU1SOT.

When the voltage of the first voltage signal NES1 is higher than a Schmitt voltage threshold SMTH of the first Schmitt trigger SHT1, a first NOR gate signal output from the output end of the first NOR gate NOR1 changes from a low level to a high level, and the first pulse wave signal PU1SOT output from the output end of the second NOR gate NOR2 changes from a high level to a low level.

Or, as shown in FIG. 9, when the first input end of the first NOR gate NOR1 receives the low-level first Schmitt trigger signal from the output end of the first Schmitt trigger SHT1, the second input end of the first NOR gate NOR1 receives the low-level pulse wave reference input signal INSS, the third input end of the first NOR gate NOR1 receives the high-level blank clock signal BLCLK, and the output end of the first NOR gate NOR1 outputs the low-level first NOR gate signal.

Until the first input end of the first NOR gate NOR1 receives the low-level first Schmitt trigger signal from the output end of the first Schmitt trigger SHT1, the second input end of the first NOR gate NOR1 receives the low-level pulse wave reference input signal INSS, and the third input end of the first NOR gate NOR1 receives the blank clock signal BLCLK which changes from a high level to a low level, the first pulse wave signal PU1SOT output from the output end of the second NOR gate NOR2 changes from a high level to a low level. Accordingly, the pulse width of the first pulse wave signal PU1SOT output from the output end of the second NOR gate NOR2 is controlled by the blank clock signal BLCLK, so as to control the pulse width of the clock signal CLK output by the second pulse wave signal generator PU2 to the control circuit CTR.

Figure 10:
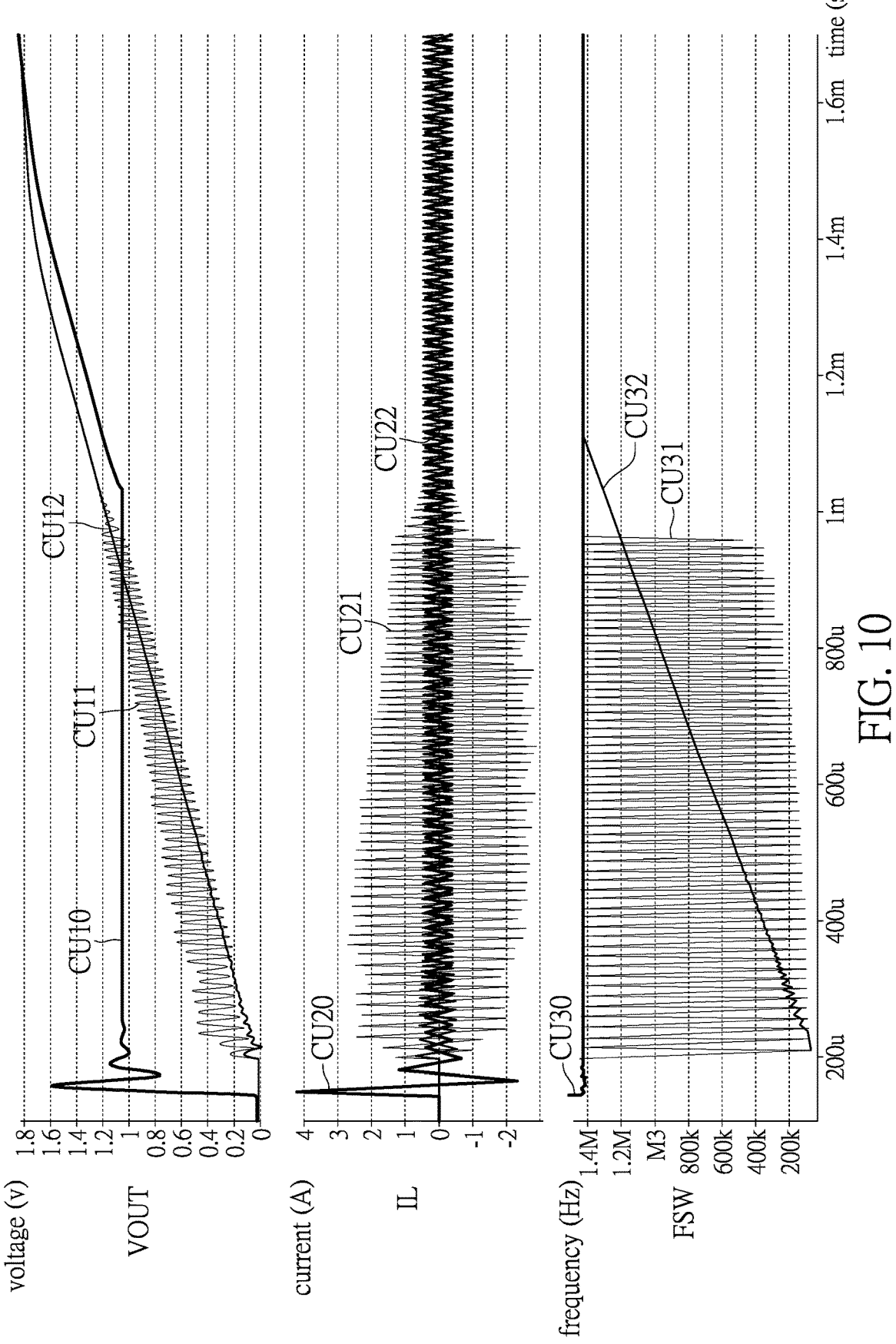
FIG. 10 is a waveform diagram of a signal of a power converter having a stable output voltage and a conventional power converter according to the first to third embodiments of the present disclosure.

Reference is made to FIG. 10, which is a waveform diagram of a signal of a power converter having a stable output voltage and a conventional power converter according to the first to third embodiments of the present disclosure.

In the startup state of a conventional power converter, even if there is a soft-start circuit to assist in switching the high-side switch and the low-side switch, since the initial output voltage of the conventional power converter is zero when it is turned on, the duty cycle of the high-side drive signal of the high-side switch is a low duty cycle and the frequency reduction operation is not performed at this time.

When the on-time of the high-side switch of the conventional power converter is a minimum on-time, a normal switching frequency indicator line CU30 of the conventional power converter as shown in FIG. 10 maintains switching of the high-side switch and the low-side switch at a fixed frequency. As a result, the output voltage VOUT of the conventional power converter will have an overvoltage event when being turned on, such as an output voltage curve CU10 shown in FIG. 10, while the output current IL of the conventional power converter will cause an overcurrent event during startup, such as an output current curve CU20 shown in FIG. 10.

When an overvoltage occurs in the output voltage VOUT of the conventional power converter, the switching frequency FSW of the conventional power converter has frequency-hopping, such as a switching frequency curve CU31 shown in FIG. 10. At this time, the output voltage VOUT of the conventional power converter is not stable, such as the output voltage curve CU11 shown in FIG. 10, and the output current IL is unstable, as an output current curve CU21 shown in FIG. 10.

When the power converter of the present disclosure is turned on, as the duty cycle of the high-side drive signal of the high-side switch increases, the switching frequency FSW of the power converter of the present disclosure changes linearly as a switching frequency curve CU32 shown in FIG. 10, so that no overvoltage event will occur in the output voltage VOUT when the power converter of the present disclosure is turned on, such as an output voltage curve CU12 shown in FIG. 10, and when the power converter of the present disclosure is turned on, the output current IL is stable as an output current curve CU22 shown in FIG. 10.

In summary, the present disclosure provides a power converter having a stable output voltage. The switching frequency of the high-side switch and the low-side switch of the power converter of the present disclosure can be modulated according to the output voltage of the power converter of the present disclosure, including automatically reducing the switching frequency of the high-side switch and the low-side switch when the on-time of the high-side switch reaches a minimum on-time, so that the output voltage of the power converter of the present disclosure is maintained at a stable value.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a stable output voltage, including:

a high-side switch, wherein a first end of the high-side switch is coupled to an input voltage;

a low-side switch, wherein a first end of the low-side switch is connected to a second end of the high-side switch, a second end of the low-side switch is grounded, a node between the first end of the low-side switch and the second end of the high-side switch is connected to a first end of an inductor, a second end of the inductor is connected to a first end of an output capacitor, and a second end of the output capacitor is grounded;

an error amplifier, wherein a first input end of the error amplifier is connected to the first end of the output capacitor, and a second input end of the error amplifier is coupled to a reference voltage;

a low-side feedback circuit connected to the second end and a control end of the low-side switch and an output end of the error amplifier, and configured to output a blank clock signal according to a voltage signal at the second end of the low-side switch, a low-side drive signal at the control end of the low-side switch, and an error amplification signal received from the output end of the error amplifier;

a pulse wave signal generator circuit connected to the low-side feedback circuit, and configured to set a frequency of a clock signal and output the clock signal according to the blank clock signal received from the low-side feedback circuit;

a control circuit connected to the pulse wave signal generator circuit, and configured to output a control signal according to the clock signal received from the pulse wave signal generator circuit; and a driver circuit connected to the control circuit, a control end of the high-side switch and the control end of the low-side switch, and configured to output a high-side drive signal to the control end of the high-side switch and output the low-side drive signal to the control end of the low-side switch according to the control signal received from the control circuit.

2. The power converter according to claim 1, further including: a voltage divider circuit, wherein an input end of the voltage divider circuit is connected to a first end of the output capacitor, an output end of the voltage divider circuit is connected to the first input end of the error amplifier, and the voltage divider circuit converts an output voltage at the first end of the output capacitor to output a divided voltage to the first input end of the error amplifier.

3. The power converter according to claim 2, wherein the voltage divider circuit includes:

a first voltage divider resistor, wherein a first end of the first voltage divider resistor is connected to the first end of the output capacitor; and a second voltage divider resistor, wherein the first end of the second voltage divider resistor is connected to the second end of the first voltage divider resistor and the first input end of the error amplifier, a third end of the second voltage divider resistor is connected to a first input end of the first voltage divider resistor, and a second of the second voltage divider resistor is grounded.

4. The power converter according to claim 1, wherein the low-side feedback circuit includes:

a low-side detector connected to the second end of the low-side switch, and configured to detect a current at the second end of the low-side switch, and convert the current detected at the second end of the low-side switch into a voltage to output a low-side detecting voltage signal;

a low-side comparator, wherein a first input end of the low-side comparator is connected to the low-side detector, a second input end of the low-side comparator is connected to the output end of the error amplifier, the low-side comparator compares a voltage of the low-side detecting voltage signal with a voltage of the error amplification signal to output a low-side comparison signal; and a frequency modulation determination circuit connected to an output end of the low-side comparator, the control end of the low-side switch and the pulse wave signal generator circuit, and configured to output the blank clock signal to the pulse wave signal generator circuit according to the low-side comparison signal and the low-side drive signal of the control end of the low-side switch.

5. The power converter according to claim 4, wherein, when the low-side switch is turned on and the voltage converted into the current at the second end of the low-side switch is higher than the error amplification signal, the low-side feedback circuit outputs a high-level blank clock signal;

wherein, when a time point generated by a pulse wave of the clock signal falls into a time interval in which the blank clock signal is at a high level, the pulse wave signal generator circuit reduces the frequency of the clock signal.

6. The power converter according to claim 5, wherein the frequency modulation determination circuit includes an AND gate, a first input end of the AND gate is connected to an output end of the low-side comparator, a second input end of the AND gate is connected to the control end of the low-side switch, and an output end of the AND gate is connected to an input end of the pulse wave signal generator circuit.

7. The power converter according to claim 1, further including: a high-side detector, wherein the high-side detector is connected to the first end of the high-side switch and a first input end of the control circuit, the high-side detector detects the current at the first end of the high-side switch and converts the current into a voltage to output a high-side detecting voltage signal, and the control circuit controls the driver circuit according to the high-side detecting voltage signal received from the high-side detector.

8. The power converter according to claim 7, wherein the control circuit includes:

a high-side comparator, wherein a first input end of the high-side comparator is connected to an output end of the high-side detector, and a second input end of the high-side comparator is connected to the output end of the error amplifier; and a control logic circuit connected to the output end of the high-side comparator, an output end of the pulse wave signal generator circuit and the input end of the driver circuit, and configured to control the driver circuit according to the high-side comparison signal received from the output end of the high-side comparator and the clock signal received from the pulse wave signal generator circuit.

9. The power converter according to claim 8, wherein the control logic circuit includes a flip-flop used as a control flip-flop, and a first input end of the control flip-flop is connected to the output end of the high-side comparator, a second input end of the control flip-flop is connected to the output end of the pulse wave signal generator circuit, and an output end of the control flip-flop is connected to an input end of the driver circuit.

10. The power converter according to claim 1, further including: a pulse wave reference input circuit including:

an input comparator, wherein a first input end of the input comparator receives a ramp signal from a ramp signal generator circuit, the second input end of the input comparator receives an oscillation signal from an oscillation circuit, an output end of the input comparator is connected to the pulse wave signal generator circuit, and the input comparator compares a voltage of the ramp signal with a voltage of the oscillation signal to output an input comparison signal;

wherein the pulse wave signal generator circuit sets a frequency of the clock signal according to the input comparison signal received from the output end of the input comparator.

11. The power converter according to claim 10, wherein the ramp signal generator circuit includes:

a current source configured to supply an input current; and an input capacitor, wherein a first end of the input capacitor is connected to the current source and the first input end of the input comparator, a voltage signal at a first end of the input capacitor is used as the ramp signal, a second end of the input capacitor is grounded, and the input current supplied by the current source flows through the input capacitor.

12. The power converter according to claim 11, wherein the pulse wave reference input circuit further includes:

an input logic circuit connected to the output end of the input comparator and the pulse wave signal generator circuit, and configured to output a pulse wave reference input signal according to the input comparison signal received from the input comparator and the clock signal received from the pulse wave signal generator circuit;

wherein the pulse wave signal generator circuit sets the frequency of the clock signal according to the pulse wave reference input signal received from the input logic circuit.

13. The power converter according to claim 12, wherein the input logic circuit includes a flip-flop used as an input flip-flop, a first input end of the pulse wave signal generator circuit is connected to the low-side feedback circuit, a first input end of the input flip-flop is connected to an output end of the pulse wave signal generator circuit, a second input end of the input flip-flop is connected to the output end of the input comparator, and an inverting output end of the input flip-flop is connected to a second input end of the pulse wave signal generator circuit.

14. The power converter according to claim 12, wherein the pulse wave reference input circuit further includes:

an input diverter switch, wherein a first end of the input diverter switch is connected to the first end of the input capacitor and the first input end of the input comparator, a second end of the input diverter switch is grounded, and a control end of the input diverter switch is connected to the output end of the pulse wave signal generator circuit.

15. The power converter according to claim 14, wherein the pulse wave signal generator circuit includes a first pulse wave signal generator, and the first pulse wave signal generator includes:

a first transistor, wherein a first end of the first transistor is coupled to a common voltage, and a control end of the first transistor receives a pulse wave reference input signal from a pulse wave reference input circuit;

a first resistor, wherein a first end of the first resistor is connected to a second end of the first transistor;

a second transistor, wherein a first end of the second transistor is connected to a second end of the first resistor, a control end of the second transistor receives the pulse wave reference signal from the pulse wave reference input circuit, and a second end of the second transistor is grounded;

a third transistor, wherein a first end of the third transistor is coupled to the common voltage;

a first Schmitt trigger, wherein an input end of the first Schmitt trigger is connected to the first end of the second transistor and a second end of the third transistor;

a first NOR gate, wherein a first input end of the first NOR gate is connected to an output end of the first Schmitt trigger, a second input end of the first NOR gate receives the pulse wave reference input signal from the pulse wave reference input circuit, and a third input end of the first NOR gate is connected to the low-side feedback circuit to receive the blank clock signal;

a second NOR gate, wherein a first input end of the second NOR gate is connected to an output end of the first NOR gate, a second input end of the second NOR gate receives the pulse wave reference input signal from the pulse wave reference input circuit, and an output end of the second NOR gate is connected to an input end of the control circuit; and a first NOT gate, wherein an input end of the first NOT gate is connected to an output end of the first NOR gate, and an output end of the first NOT gate is connected to a control end of the third transistor.

16. The power converter according to claim 15, wherein the first pulse wave signal generator further includes:

a first capacitor, wherein a first end of the first capacitor is connected to the input end of the first Schmitt trigger, and a second end of the first capacitor is grounded.

17. The power converter according to claim 16, wherein the pulse wave signal generator circuit includes a second pulse wave signal generator, and the second pulse wave signal generator includes:

a fourth transistor, wherein a first end of the fourth transistor is coupled to the common voltage, and a control end of the fourth transistor is connected to the output end of the second NOR gate;

a second resistor, wherein a first end of the second resistor is connected to a second end of the fourth transistor;

a fifth transistor, wherein a first end of the fifth transistor is connected to a second end of the second resistor, a control end of the fifth transistor is connected to the output end of the second NOR gate, and a second end of the fifth transistor is grounded;

a sixth transistor, wherein a first end of the sixth transistor is coupled to the common voltage;

a second Schmitt trigger, wherein an input end of the second Schmitt trigger is connected to the first end of the fifth transistor and a second end of the sixth transistor;

a third NOR gate, wherein a first input end of the third NOR gate is connected to an output end of the second Schmitt trigger, and a second input end of the third NOR gate is connected to the output end of the second NOR gate;

a fourth NOR gate, wherein a first input end of the fourth NOR gate is connected to an output end of the third NOR gate, a second input end of the fourth NOR gate is connected to an output end of the second NOR gate, and an output end of the fourth NOR gate is connected to an input end of the control circuit; and a second NOT gate, wherein an input end of the second NOT gate is connected to the output end of the third NOR gate, and an output end of the second NOT gate is connected to a control end of the sixth transistor.

18. The power converter according to claim 17, wherein the second pulse wave signal generator further includes:

a second capacitor, wherein a first end of the second capacitor is connected to the input end of the second Schmitt trigger, and a second end of the second capacitor is grounded.

19. The power converter according to claim 7, further including:

a compensation circuit connected to a node between the output end of the error amplifier and a second input end of the control circuit, and configured to compensate the error amplification signal output from the output end of the error amplifier to the input end of the control circuit.

20. The power converter according to claim 1, further including:

an output resistor, wherein a first end of the output resistor is connected to a second end of an output inductor, and a second end of the output resistor is grounded.

* * * * *